(12) United States Patent
Bank et al.

(10) Patent No.: US 9,607,277 B2
(45) Date of Patent: Mar. 28, 2017

(54) SYSTEM AND METHOD FOR CROWD SOURCING

(71) Applicant: INTERNATIONAL BUSINESS MACHINES CORPORATION, Armonk, NY (US)

(72) Inventors: Judith Helen Bank, Cary, NC (US); Liam Harpur, Dublin (IE); Lin Sun, Morrisville, NC (US); Patrick Joseph O'Sullivan, Dublin (IE); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/660,455

(22) Filed: Mar. 17, 2015

(65) Prior Publication Data

US 2015/0254786 A1    Sep. 10, 2015

Related U.S. Application Data

(63) Continuation of application No. 14/196,749, filed on Mar. 4, 2014.

(51) Int. Cl.
 *G06Q 10/06* (2012.01)
 *G06Q 50/00* (2012.01)

(52) U.S. Cl.
 CPC ........ *G06Q 10/063112* (2013.01); *G06Q 10/06311* (2013.01); *G06Q 50/01* (2013.01)

(58) Field of Classification Search
 CPC ........... G06Q 10/063112; G06Q 10/06; G06Q 10/06311; G06Q 10/0631; G06Q 10/063114; G06Q 10/06398; G06Q 10/10; G06Q 10/1053; G06Q 30/02; G06Q 50/01; G06Q 10/103; G06Q 30/0208; G06Q 30/08; G06Q 10/02
 See application file for complete search history.

(56) References Cited

U.S. PATENT DOCUMENTS 5,918,207 A    6/1999 McGovern
6,272,467 B1*  8/2001 Durand ............... G06Q 10/02
                                           705/26.1

(Continued)

OTHER PUBLICATIONS

International Business Machines Corporation, "List of IBM Patents or Patent Applications Treated as Related," submitted Mar. 31, 2015, 2 pages.

*Primary Examiner* — Reza Nabi
(74) *Attorney, Agent, or Firm* — Charles L. Moore; Moore & Van Allen PLLC

(57) ABSTRACT

A method for crowd sourcing tasks may include identifying a group of potential candidates for crowd sourcing. Each candidate of the group of potential candidates may be identified based on the candidate being expected to accept a certain type of task. The certain type of task may be at least a task that is performable within a predetermined range of time. The method may also include receiving a request to perform a particular task from a requester. The method may additionally include determining if the particular task is the certain type of task. The method may further include transmitting an offer for performance of the particular task to at least a subgroup of the group of potential candidates in response to the particular task being the certain type of task.

10 Claims, 5 Drawing Sheets

(56) References Cited

U.S. PATENT DOCUMENTS

| | | | | |
|---|---|---|---|---|
| 8,255,258 B1* | 8/2012 | Cohen | G06Q 10/06 | 705/7.21 |
| 8,554,605 B2* | 10/2013 | Oleson | G06Q 10/06311 | 705/319 |
| 8,626,545 B2* | 1/2014 | Van Pelt | G06Q 10/06398 | 705/317 |
| 2003/0204431 A1* | 10/2003 | Ingman | G06Q 10/06311 | 705/7.16 |
| 2007/0260776 A1* | 11/2007 | Rojahn | G06Q 10/10 | 710/36 |
| 2008/0152122 A1* | 6/2008 | Idan | H04M 3/5175 | 379/265.07 |
| 2009/0006164 A1* | 1/2009 | Kaiser | G06Q 10/06 | 705/7.14 |
| 2010/0010860 A1* | 1/2010 | Bose | G06Q 10/063112 | 705/7.14 |
| 2010/0014653 A1* | 1/2010 | Kumar | H04M 3/5191 | 379/210.01 |
| 2011/0184771 A1 | 7/2011 | Wells | | |
| 2011/0208665 A1* | 8/2011 | Hirsch | G06Q 10/1053 | 705/321 |
| 2011/0246881 A1* | 10/2011 | Kushman | G06F 9/4446 | 715/708 |
| 2011/0313801 A1* | 12/2011 | Biewald | G06Q 10/0631 | 705/7.12 |
| 2011/0313820 A1* | 12/2011 | Biewald | G06Q 10/06311 | 705/7.42 |
| 2011/0313933 A1* | 12/2011 | Dai | G06Q 10/103 | 705/301 |
| 2012/0072253 A1* | 3/2012 | Ritter | G06Q 10/06 | 705/7.13 |
| 2012/0143952 A1* | 6/2012 | von Graf | G06Q 50/01 | 709/204 |
| 2012/0265573 A1* | 10/2012 | Van Pelt | G06Q 10/063114 | 705/7.14 |
| 2012/0284090 A1* | 11/2012 | Marins | G06Q 10/0631 | 705/7.39 |
| 2013/0066944 A1* | 3/2013 | Laredo | G06Q 50/01 | 709/203 |
| 2013/0096968 A1* | 4/2013 | Van Pelt | G06Q 10/06398 | 705/7.13 |
| 2013/0185138 A1* | 7/2013 | Roy | G06Q 30/02 | 705/14.35 |
| 2013/0197954 A1* | 8/2013 | Yankelevich | G06Q 30/02 | 705/7.13 |
| 2013/0204652 A1* | 8/2013 | Marins | G06Q 30/02 | 705/7.15 |
| 2013/0231969 A1* | 9/2013 | Van Pelt | G06Q 10/06311 | 705/7.13 |
| 2013/0275803 A1* | 10/2013 | Kern | G06Q 10/063112 | 714/15 |
| 2014/0067451 A1* | 3/2014 | Balamurugan | G06Q 10/06 | 705/7.14 |
| 2014/0188787 A1* | 7/2014 | Balamurugan | G06Q 30/0629 | 707/609 |
| 2014/0195295 A1* | 7/2014 | Whitley | G06Q 10/0633 | 705/7.27 |
| 2014/0278633 A1* | 9/2014 | Daly | G06Q 10/063112 | 705/7.14 |
| 2014/0278646 A1* | 9/2014 | Adrian | G06Q 10/063114 | 705/7.15 |
| 2014/0278850 A1* | 9/2014 | Boccuzzi, Jr. | G06Q 30/0208 | 705/14.11 |
| 2014/0372160 A1* | 12/2014 | Nath | G06Q 10/06311 | 705/7.13 |
| 2015/0199632 A1* | 7/2015 | Chander | G06Q 10/06316 | 705/7.13 |
| 2015/0199966 A1* | 7/2015 | Paulik | G10L 15/26 | 704/235 |
| 2015/0228035 A1* | 8/2015 | Williams, III | G06Q 50/01 | 705/2 |
| 2015/0242798 A1* | 8/2015 | Zou | G06Q 10/063114 | 705/7.15 |
| 2015/0254596 A1* | 9/2015 | Nayar | G06Q 50/01 | 705/7.14 |
| 2015/0254786 A1* | 9/2015 | Bank | G06Q 10/06311 | 705/7.13 |

* cited by examiner

SYSTEM AND METHOD FOR CROWD SOURCING

CROSS-REFERENCE TO RELATED APPLICATIONS

This application is a continuation application of U.S. patent application Ser. No. 14/196,749, filed Mar. 4, 2014, the contents of which are incorporated herein by reference entirety.

BACKGROUND

Aspects of the present invention relate to crowd sourcing and more particularly to a method, system and computer program product for using crowd sourcing for performance or execution of tasks.

Crowd sourcing may be used as a way to complete a project or produce a product. There are various methods to participate in crowd sourcing, but none that seamlessly interact with the existing work activity of a user that is providing or offering a task for crowd sourcing the performance or execution of the task and participants or candidates for accepting the crowd sourced offer to perform or execute the task. Existing crowd sourcing methods may broadcast messages, such by e-mail, posting via social media or other arrangements to find crowd sourced candidates or participants who have expressed interest in participating in crowd sourcing. Another crowd sourcing technique is to create or use Web sites that post crowd sourced opportunities. Such crowd sourcing arrangements are cumbersome, inefficient and invasive. Additionally, such crowd sourcing arrangements do not provide any mechanism for targeting potential candidates for efficient and timely completion of crowd sourced tasks.

BRIEF SUMMARY

According to one aspect of the present invention, a method for crowd sourcing tasks may include identifying, by a computer system, a group of potential candidates for crowd sourcing. Each candidate of the group of potential candidates may be identified based on the candidate being expected to accept an offer for performance or execution of a certain type of task. The certain type of task may be at least a task that is performable or executable within a predetermined range of time. The method may also include receiving, by the computer system, a request to perform or execute a particular task from a requester. The method may additionally include determining, by the computer system, if the particular task corresponds to the certain type of task. The method may further include transmitting, by the computer system, an offer for performance or execution of the particular task to at least a subgroup of the group of potential candidates in response to the particular task corresponding to the certain type of task for a target candidate.

According to another aspect of the present invention, a system for crowd sourcing tasks may include a processor and a crowd sourcing module operating on the processor. The crowd sourcing module may be configured to perform as set of functions including identifying a group of potential candidates for crowd sourcing. Each candidate of the group of potential candidates may be identified based on the candidate being expected to accept an offer for performance or execution of a certain type of task. The certain type of task may be at least a task that is performable or executable within a predetermined range of time. The crowd sourcing module may also be configured for receiving a request to perform or execute a particular task from a requester and for determining if the particular task corresponds to the certain type task. The crowd sourcing module may be further configured for transmitting an offer for performance or execution of the particular task to at least a subgroup of the group of potential candidates in response to the particular task corresponding to the certain type of task.

According to another aspect of the present invention, a computer program product for crowd sourcing tasks may include a computer readable storage medium having program instructions embodied therewith. The program instructions are executable by a device to cause the device to perform a method that may include identifying a group of potential candidates for crowd sourcing. Each candidate of the group of potential candidates is identified based on the candidate being expected to accept an offer for performance of a certain type of task. The certain type of task may be at least performable within a predetermined range of time. The method may also include receiving a request to perform a particular task from a requester and determining if the particular task corresponds to the certain type of task. The method may additionally include transmitting an offer for performance of the particular task to at least a subgroup of the group of potential candidates in response to the particular task corresponding to the certain type of task.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1A:
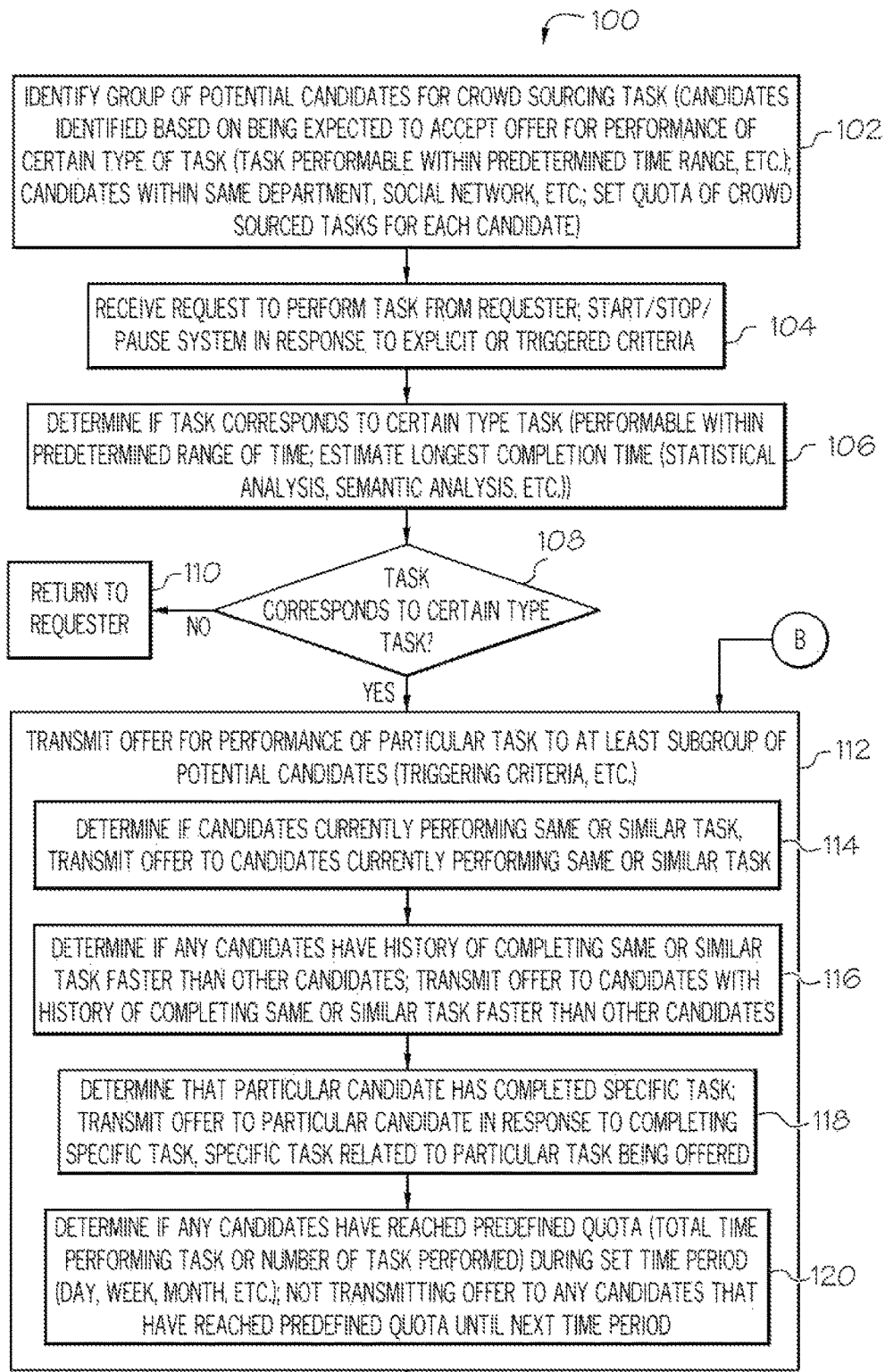
FIGS. 1A-1C (collectively FIG. 1) are a flow chart of an example of a method for crowd sourcing tasks in accordance with an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), as digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through is waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or to wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, to programmable data processing apparatus, and/or other devices to function in a particular manner, such that the computer readable storage medium having instructions stored therein comprises an article of manufacture including instructions which implement aspects of the function/act specified in the flowchart and/or block, diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1B:
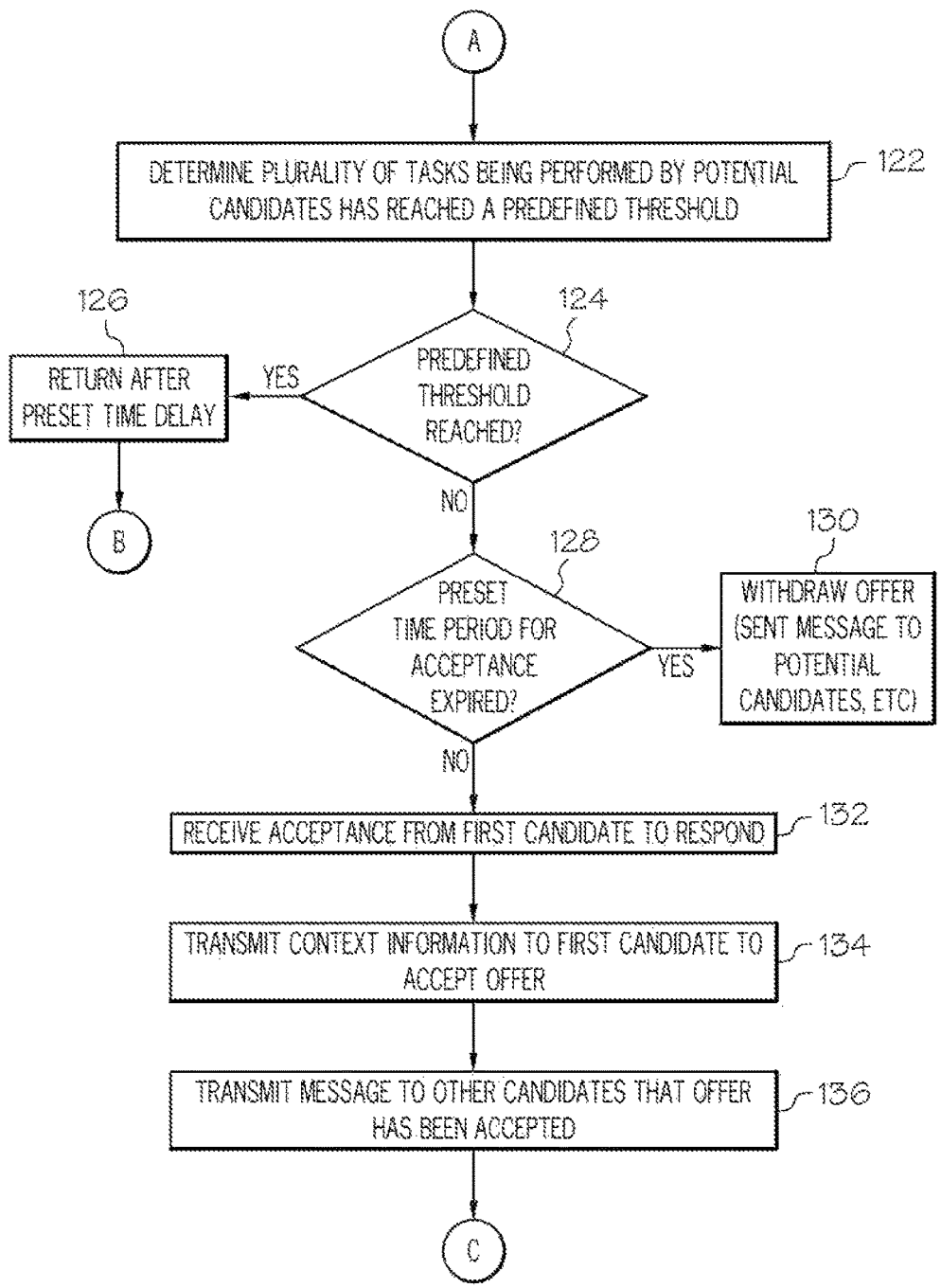
Figure 1C:
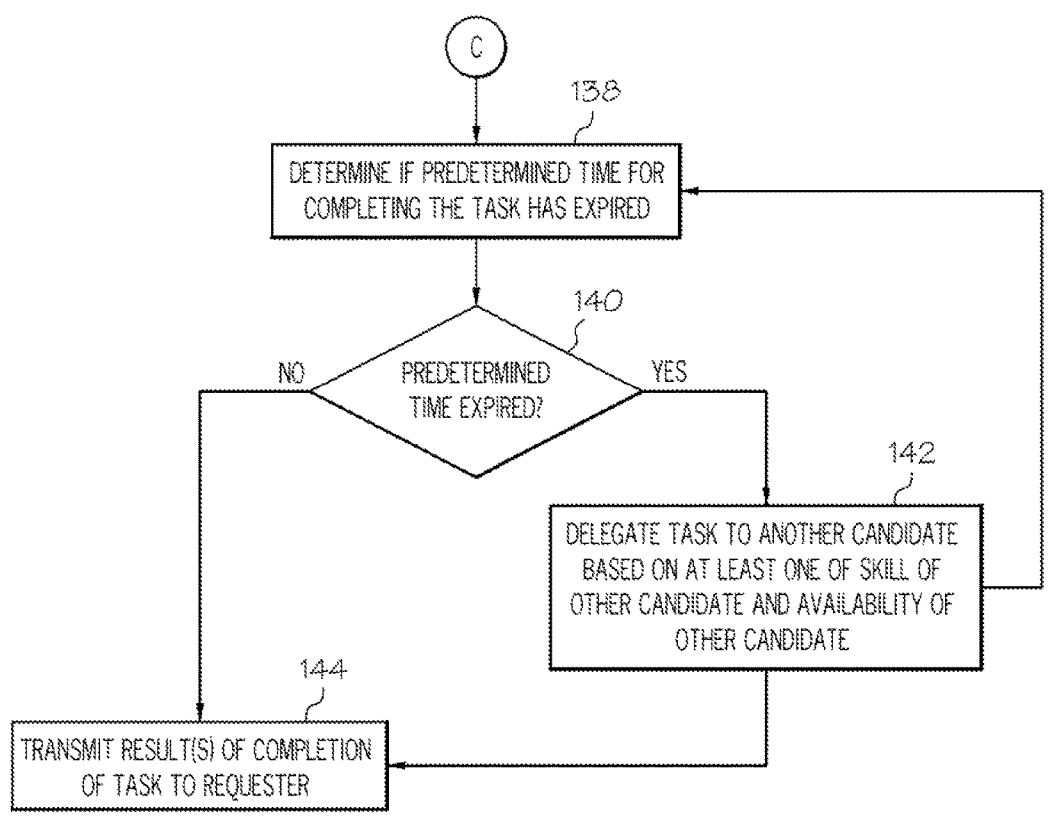

FIGS. 1A-1C (collectively FIG. 1) are a flow chart of an example of a method 100 for crowd sourcing tasks in accordance with an embodiment of the present invention. In block 102, a group of potential candidates for crowd sourcing may be identified. Each candidate of the group of candidates may be identified based on the candidate being expected to accept an offer for performance or execution of a certain type of task. By being expected to accept an offer for performance or execution of the certain type of task, the candidate may have previously agreed to accept offers to perform the certain type of tasks or a pre-arrangement may have been made for the candidate to accept offers to perform the certain type of tasks. The certain type of tasks may include but is not necessarily limited to tasks that may be performed or executed within a predetermined time range, although other criteria may also be used in defining the certain type of tasks. For example, the certain type of tasks may be micro-tasks or tasks that may be performed or executed by a particular candidate, target candidate or user within a set number of seconds, minutes or other preset time or predetermined time period. The group of potential candidates may also be individuals within a particular group or organization, social network or other type relationship.

A maximum quota of crowd sourcing tasks may be set for each potential candidate or group of potential candidates. The maximum quota may include at least one of a maximum number of the certain type of tasks that are performable or executable within a set time period and a maximum time spent performing or executing the certain type of tasks within the set time period. The set time period may be any block of time, such as an hour, set number of hours, a day, a week or other period of time.

In block 104, a request to perform or execute a particular task may be received from a requester. An administrator or user of a system configured to perform the method 100 may control operation of the method 100 via an interface and may start, stop or pause the system. The system or method 100 may also be stopped, started or paused in response to explicit or triggering criteria. For example a user may select not to crowd source a certain task or tasks if a predetermined criteria or condition is met. An example of a triggering criteria will be described with reference to FIG. 2.

In block 106, a determination may be made if the particular task received from the requester corresponds to the certain type of task that may be crowd sourced. For example, a determination may be made if the particular task is performable or executable within the predetermined range of time. An estimate of the longest completion or execution time for the particular task may be determined. The estimated completion time may be determined by statistical analysis, semantic analysis or other techniques. An example of statistical analysis may involve analyzing a distribution of users that opt to complete a task accepted for performance as soon as possible compared to users who consciously delay completing a task accepted for performance. An example of semantic analysis may include analyzing the communication including the request for performance of the particular task from the requester, such as e-mail or other communication, for a specific completion time or date. In accordance with an embodiment, a communications may be sent to the requester asking the requester to specify a maximum completion time for the crowd sourced task if the completion time or a completion date has not been specified in the request.

In block 108, a determination may be made if the particular task or requested task corresponds to the certain type of task for crowd sourcing the performance of the task. For example, can the particular task be performed or executed within the predetermined range of time. If the particular task does not correspond to the certain type of task for crowd sourcing or cannot be performed within the predetermined range of time, the request may be returned to the requester or the requester may be notified that the request to perform or execute the particular task cannot be crowd sourced.

If the particular task corresponds to the certain type of task that can be crowd sourced, the method 100 may advance to block 112.

In block 112, the offer for performance or execution of the particular task may be transmitted to at least a subgroup of the group of potential candidates in response to the particular task corresponding to the certain type of task for crowd sourcing. Or, in accordance with an embodiment of the invention, the particular task is performable or executable within the predetermined range of time for crowd sourcing. Examples of different comparisons or analysis that may be performed for determining at least a subgroup of the group of potential candidates to which the offer for performance of the particular task may be transmitted will be described with reference to blocks 114-120. The exemplary operations in blocks 114-120 may be used independently or may be used in any combination. The exemplary comparisons or analysis described with reference to blocks 114-120 may be performed by a comparison engine or other device configured to perform the operations described. The present invention is not intended to be limited by the exemplary operations described with reference to blocks 114-120 and there may be other procedures and criteria for intelligently or analytically determining candidates for transmitting the offer for crowd sourcing performance or execution of the particular task as described herein. For instance, an example of a triggering criterion for performance of a particular task will be described with reference to FIG. 2.

In block 114, a determination may be made if any potential candidates are currently performing or executing a same task or a similar task to the particular task. The offer for performance or execution of the particular task may be transmitted to those candidates who are currently performing the same task or the similar task compared to the particular task.

In block 116, a determination may be made if any candidates have a history of completing or executing the same task or a similar task to the particular task fluster than other candidates. The offer for performance or execution of the particular task may be transmitted to those candidates that have the history of completing the same task or the similar task faster compared to other candidates.

In block 118, a determination may be made if a particular candidate has completed a specific task. The offer for performance or execution of the particular task may be transmitted to the particular candidate in response to the particular candidate having completed the specific task, wherein the specific task is related to the particular task being offered.

In block 120, a determination may be made if any candidates have reached a predefined quota of one of a total time in performing a group of tasks during a set time period or a number of tasks performed during the set time period. An offer for performance of another task may not be transmitted to any candidates that have reached the predefined quota until a next set time period. The set time period may be any block of time, such as an hour, preset number of hours, a day, a portion of a day, a week, portion of a week or any time period that may be set by an administrator or other user. For example, the set time period may be specified in a policy of an organization or company.

In block 122, a determination may be made if a plurality of tasks are being performed by the potential candidates has reached a predefined threshold. If the predefined threshold has been reached in block 124, the method 100 may be may advance to block 126. The method 100 may return to block 112 after a preset time delay in block 126 in order to provide time for some of the plurality of tasks being performed by the potential candidates to be completed and to provide capacity for crowd sourcing new tasks.

In accordance with another embodiment, if a plurality of tasks being performed or that have been performed reaches the predefined threshold during a set time period, no additional offers for performing tasks may be transmitted until the next time period. Accordingly, a quota may be set for the maximum number of crowd sourced tasks that may be performed by the potential candidates during a set time period. A maximum quota of time for performing crowd sourced tasks during a set time period and/or a maximum quota for the number of crowd sourced tasks that may be perform during the set time may be set for each potential candidate, for the group of potential candidates or both.

If the predefined threshold has not been reached in block 124, the method 100 may advance to block 128. In block 128, a determination may be made if a preset time period for acceptance of the offer has expired. If the preset time period for acceptance of the offer for performance of the task has expired, the method 100 may advance to block 130. In block 130, the offer may be withdrawn. A message may be sent to the potential candidates to notify the candidates that the offer for performance of the task has been withdrawn.

If the preset time period for acceptance of the offer for performance of the particular task has not expired in block 128, the method 100 may advance to block 132. In block 132, an acceptance may be received from the first candidate to respond to the offer for performance of the predetermined task.

In block 134, context information may be transmitted to the accepting candidate in response to receiving the acceptance from the accepting candidate. In block 136, a message may be transmitted to the other candidates that the offer has been accepted.

In block 138, a determination may be made if a predetermined time for completing the task has expired. If the predetermined time has expired in block 140, the method 100 may advance to block 142. In block 142, the particular task may be delegated to another candidate in response to the particular task not being completed by the accepting candidate within the predetermined time period. The particular task may be delegated to the other candidate based on at least one of the skill of the other candidate and an availability of the other candidate for performing the task. The skill of the candidate may include the candidate having previously performing the same or similar task and the candidate having a history of being able to complete the task within the time period set for completing the task or faster than the set time period for completion. After delegating the task to the other candidate, the method 100 may return to block 138 and a method 100 may continue similar to that previously described. The original accepting candidate may be notified that the task has been delegated to another candidate for completion of the task.

If the determination is made in block 140 that the predetermined time period has not expired, the method may advance to block 144. In block 144, the results of completion of the task may be transmitted to the requester.

Figure 2:
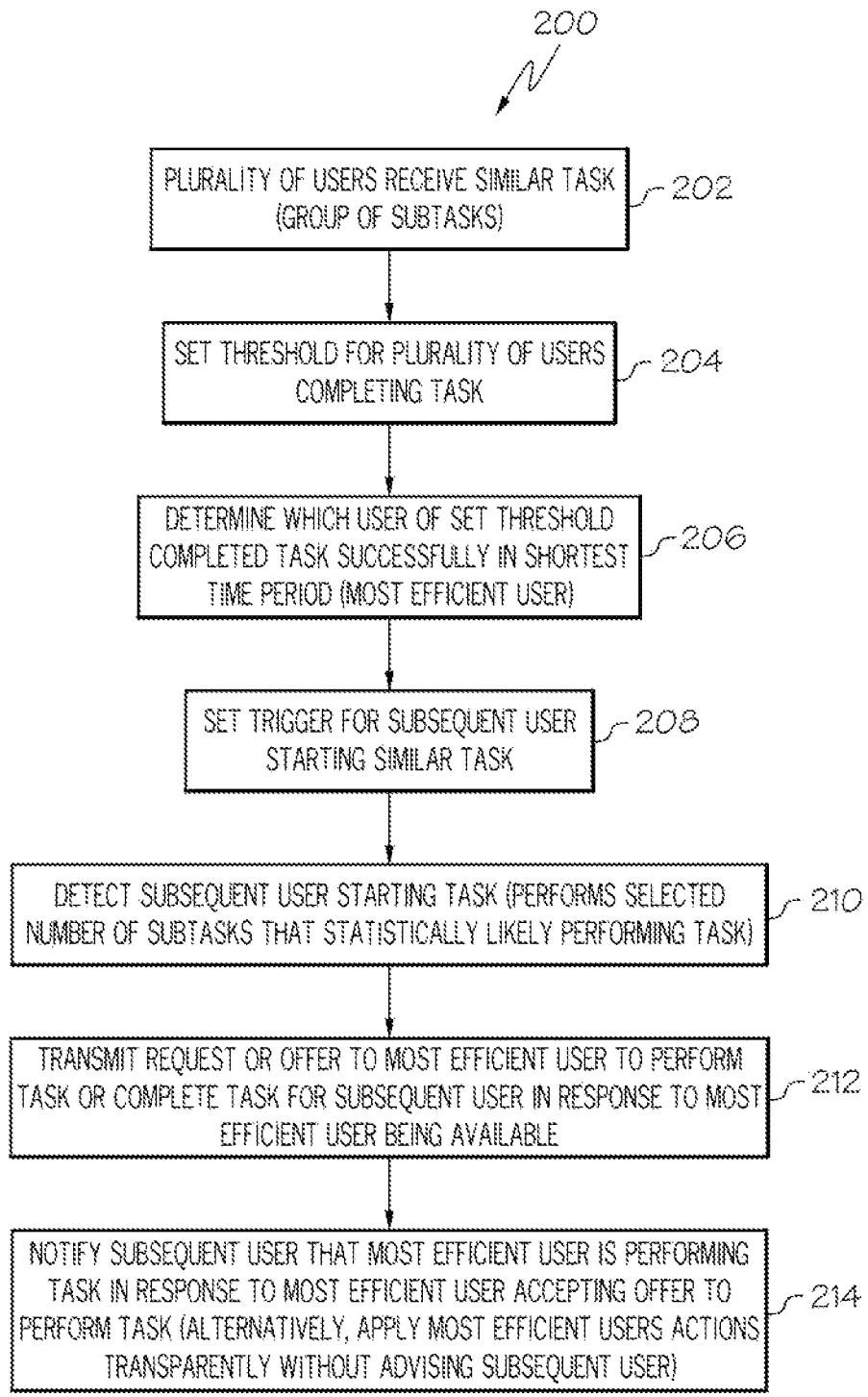
FIG. 2 is an example of a method for crowd sourcing a task using a trigger criterion in accordance with an embodiment of the present invention.

FIG. 2 is an example of a method 200 for crowd sourcing a task using a trigger criterion in accordance with an embodiment of the present invention. The method 200 may be incorporated in block 112 of the method 100 for determining a candidate for transmitting an offer for performance of a particular task. In block 202, a plurality of users may receive a similar task for performance. The task may include a group of subtasks.

In block 204, a threshold may be set for a plurality of users having completed the task. In block 206, a determination may be made which user of the set threshold of users completed the task successfully in the shortest time period. This user may be designated as the most efficient user.

In block 208, a trigger may be set for a subsequent user beginning the same or a similar task. In block 210, to subsequent user may be detected starting the same or similar task. For example, a selected number of subtasks of the task may be performed by the subsequent user that statistically indicate the subsequent user is likely performing the task.

In block 212, a request or offer may be transmitted to the most efficient user for performance of the task or to complete the task for the subsequent user. The request or offer may be transmitted in response to the most efficient user being available for completing the task and any other criteria similar to those criteria previously described that may need to be met being met.

In block 214, the subsequent user may be notified that the most efficient user is performing the task in response to the most efficient user accepting the offer to perform the task or complete the task. In another embodiment, the most efficient user's actions may be applied transparently to complete the task without advising the subsequent user that the most efficient user is performing or completing the task. The subsequent user may simply receive a notification that the task is complete.

Figure 3:
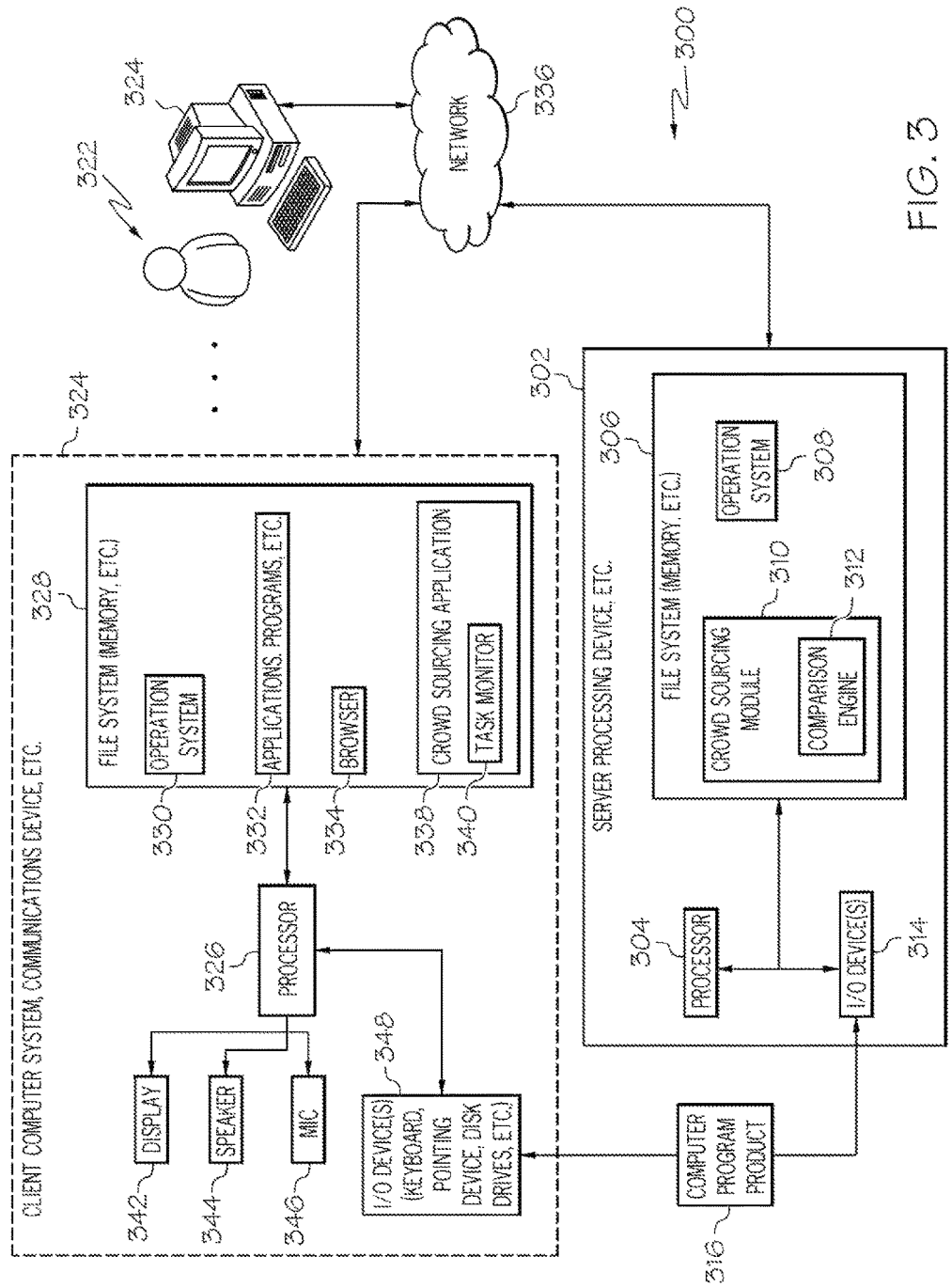
FIG. 3 is a block schematic diagram of an example of a system for crowd sourcing tasks in accordance with an embodiment of the present invention.

FIG. 3 is a block schematic diagram of an example of a system 300 for crowd sourcing tasks in accordance with an embodiment of the present invention. The method 100 of FIGS. 1A-1C and method 200 of FIG. 2 may be embodied in and performed by the system 300. The system 300 may include a processing device 302. The processing device 302 may be a server or similar processing device. The processing device 302 may include a processor 304 for controlling operation of the processing device 302 and for performing functions, such as those described herein with respect to crowd sourcing tasks. The processing device 302 may also include a file system 306 or memory. An operating system 308, applications and other programs may be stored on the file system 306 for running or operating on the processor 304. A crowd sourcing module 310 or system may also be stored on the file system 306 and may be compiled and run on the processor 304 to perform the functions for crowd sourcing tasks similar to that described herein. The method 100 of FIGS. 1A-1C and method 200 of FIG. 2 may be embodied in the crowd sourcing module 310 and performed by the processor 304 when the crowd sourcing module 310 is compiled and run on the processor 304.

The crowd sourcing module 310 may include a comparison engine 312. Similar to that previously discussed, the comparison engine 312 may be configured to perform comparisons or analysis for determining potential candidates for transmitting an offer for performance of a particular task similar to that described with reference to blocks 112-120 of FIG. 1A.

The processing device 302 may also include one or more input devices, output devices or combination input/output devices, collectively I/O devices 314 in FIG. 3. The I/O devices 314 may include, but are not necessarily limited to, a keyboard or keypad, pointing device, such as a mouse, disk drive and any other devices to permit a user to interface with and control operation of the processing device 302 and to access the crowd sourcing module 310 or system. At least one of the I/O devices 314 may be a device to read a computer program product, such as computer program product 316. The computer program product 316 may be similar to those described in more detail herein. The crowd sourcing module 310 may be loaded on the file system 306 from a computer program product, such as computer program product 316.

A user 322 of the system 300 for crowd sourcing tasks may use a computer system 324 or communications device to access the processing device 302 or server and crowd sourcing module 310 or system for crowd sourcing tasks. The computer system 324 or communications device may be any sort of communications device including a mobile or handheld computer or communications device. The computer system 324 may include a processor 326 to control, operation of the computer system 324 and a file system 328, memory or similar data storage device. An operating system 330, applications 332 and other programs may be stored on the file system 328 for running or operating on the processor 326. A web or Internet browser 334 may also be stored on the file system 328 for accessing the processing device 302 or server via a network 336. The network 336 may be the Internet, an intranet or other private or proprietary network.

In accordance with an embodiment, a crowd sourcing application 338, feature or module may also be stored on the file system 328 and operate on the processor the 326 of the user's computer system 324. The crowd sourcing application 338 operating on the computer system 326 may interface with or operate in conjunction with the crowd sourcing module or system 310 on the processing device 302 or server to perform the functions and operations described herein for crowd sourcing tasks. Accordingly, crowd sourcing application 338 operating on the computer system 324 may perform some of the functions and operations of the methods 100 and 200 and crowd sourcing module 310 operating on the server 302 may perform other functions of the methods 100 and 200.

The crowd sourcing application 338 may include a task monitor 340. The task monitor 340 may be configured for keeping track of tasks requested by the user to be performed by crowd sourcing the tasks and tasks that have been offered by other users or requesters for crowd sourcing performance of the tasks. The computer system 324 may also include a display 342, a speaker system 344, and a microphone 346 for voice communications. One or more user interfaces may be presented on the display 342 for controlling operating the crowd sourcing application 338 and crowd sourcing module 310 and for performing the operations and functions described herein. For example, a user interface configured for allowing a user to set a maximum quota of crowd sourcing tasks for each potential candidate may be presented on the display 342. The maximum quota may include at least one of a maximum number of the certain type of tasks that are performable within a set time period and a maximum time spent performing the certain type of tasks within the set time period.

The computer system 324 may also include one or more input devices, output devices or combination input/output devices, collectively I/O devices 348. The I/O devices 348 may include a keyboard or keypad, pointing device, such as a mouse, disk drives and any other devices to permit a user, such as user 322, to interface with and control operation of the computer system 324 and to access the crowd sourcing application 338 and crowd sourcing system 310 on server 302. The I/O devices 348 may also include at least one device configured to read computer code from a computer program product, such as computer program product 316.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for crowd sourcing tasks, comprising:
    identifying, by a computer system, a group of potential candidates for crowd sourcing, wherein each candidate of the group of potential candidates is identified based on the candidate being expected to accept an offer for performance of a certain type of task, the certain type of task being at least performable within a predetermined range of time;
    receiving, by the computer system, a request to perform a particular task from a requester;
    determining, by the computer system, if the particular task corresponds to the certain type of task; and
    transmitting, by the computer system, an offer for performance of the particular task to a subgroup of the group of potential candidates in response to the particular task corresponding to the certain type of task for a target candidate,
    wherein transmitting the offer for performance of the particular task to the subgroup of the group of potential candidates comprises:
    determining when any candidates are currently performing the same task or similar task to the particular task, and transmitting the offer for performance of the particular task to the candidates that are currently performing the same task or the similar task;
    determining when any candidates have a history of completing the same task or the similar task to the particular task faster than other candidates, and transmitting the offer for performance of the particular task to the candidates that have the history of completing the same task or the similar task faster than the other candidates;
    determining when a particular candidate has completed a specific task, and transmitting the offer for performance of the particular task to the particular candidate in response to the particular candidate having completed the specific task, wherein the specific task is related to the particular task being offered; and
    determining when any candidates have reached a predefined quota of one of a total time in performing a group of tasks during a set time period or a number of tasks performed during the set time period, and not transmitting an offer for performance of another task to any candidates that have reached the predefined quota until a next set time period,
    wherein the next set time period is configurable by a user based on a policy.

2. The method of claim 1, further comprising transmitting context information to an accepting candidate in response to the offer for performance of the particular task being accepted by the accepting candidate.

3. The method of claim 1, further comprising transmitting a result of completion of the task to the requester.

4. The method of claim 1, further comprising setting a maximum quota of crowd sourcing tasks for each potential candidate, wherein the maximum quota comprises at least one of a maximum number of the certain type of tasks that are performable within the set time period and maximum time spent performing the certain type of tasks within the set time period.

5. The method of claim 1, further comprising withdrawing the offer for performance of the particular task in response to the offer not being accepted within a preset time period.

6. The method of claim 1, further comprising delegating the particular task to another candidate in response to the particular task not being completed by an accepting candidate within a predetermined time period, wherein the particular task is delegated to the other candidate based on at least one of a skill of the other candidate and an availability of the other candidate.

7. The method of claim 1, further comprising sending a message in response to the offer for performance of the particular task being accepted by one of the potential candidates of the subgroup, the message being sent to potential candidates of the subgroup that did not accept the offer for performance of the particular task.

8. The method of claim 1, wherein determining if the particular task is the certain type of task comprises determining a longest completion time for performance of the particular task.

9. The method of claim 1, further comprising:
determining that a threshold number of users have completed a specific task;
determining which user of the threshold number of users successfully completed the specific task in a shortest time period;
setting a trigger for a subsequent user starting a same task or a similar task as the specific task;
detecting the subsequent user starting the same or the similar task; and requesting the user that successfully completed the specific task in the shortest time period to perform the same or the similar task for the subsequent user.

10. The method of claim 1, further comprising:
determining that a plurality of crowd sourcing tasks being performed by the group of potential candidates has reached a predefined threshold; and
delaying a preset time period for at least a portion of the plurality of crowd sourcing tasks to be completed before transmitting an offer for crowd sourcing a new task.

* * * * *